United States Patent
Gonzalez et al.

(10) Patent No.: US 9,443,208 B2
(45) Date of Patent: Sep. 13, 2016

(54) BOTTOM-UP OPTIMIZED SEARCH SYSTEM AND METHOD

(75) Inventors: Dario Gonzalez, Kennesaw, GA (US); TahChuan Ong, Marietta, GA (US); Darren YeeSoon Tan, Atlanta, GA (US); Jonathan P. McClure, Alpharetta, GA (US); Santiago Matteo, Marietta, GA (US); Rajenderkumar Rajarathinam, Dunwoody, GA (US)

(73) Assignee: SIX CONTINENTS HOTELS, INC., Atlanta, GA (US)

( * ) Notice: Subject to any disclaimer, the term of this patent is extended or adjusted under 35 U.S.C. 154(b) by 537 days.

(21) Appl. No.: 12/718,446

(22) Filed: Mar. 5, 2010

(65) Prior Publication Data

US 2011/0218830 A1 Sep. 8, 2011

(51) Int. Cl.
*G06Q 10/00* (2012.01)
*G06Q 10/02* (2012.01)
*G06Q 10/10* (2012.01)

(52) U.S. Cl.
CPC .............. *G06Q 10/02* (2013.01); *G06Q 10/10* (2013.01)

(58) Field of Classification Search
CPC ............................. G06Q 10/02; G06Q 10/025
USPC ............................................................ 705/5
See application file for complete search history.

(56) References Cited

U.S. PATENT DOCUMENTS

| | | | |
|---|---|---|---|
| 5,237,499 A | 8/1993 | Garback | 364/407 |
| 6,119,094 A | 9/2000 | Lynch et al. | 705/5 |
| 6,477,520 B1 | 11/2002 | Malaviya et al. | 706/47 |
| 6,574,607 B1 | 6/2003 | Carter et al. | 705/26 |
| 6,609,098 B1 | 8/2003 | DeMarcken | 705/6 |
| 6,876,991 B1 | 4/2005 | Owen et al. | 706/46 |
| 7,082,400 B2 | 7/2006 | Jones et al. | 705/6 |
| 7,124,096 B2 | 10/2006 | Dutta et al. | 705/26 |

(Continued)

FOREIGN PATENT DOCUMENTS

| | | |
|---|---|---|
| CA | 2 759 039 A1 | 11/2010 |
| JP | 2000-067131 | 3/2000 |

(Continued)

OTHER PUBLICATIONS

Niemann, Magnus, Mochol, Malgorzata, and Tolksdorf, Robert, "Enhancing Hotel Search with Semantic Web Technologies," Journal of Theoretical and Applied Electronic Commerce Research, vol. 3, Issue 2, Aug. 2008, pp. 82-96.*

(Continued)

*Primary Examiner* — Nathan Erb
(74) *Attorney, Agent, or Firm* — Kilpatrick Townsend & Stockton LLP (57) ABSTRACT

A system and method for searching for hotel rooms is provided. A pre-compute database comprising real-time availability attributes associated with hotel rooms on a plurality of length of stays may be generated, and a query for at least one hotel for a date range may be received. The availability of each day within the date range on a plurality of length of stays may be calculated by applying business requirements according to the query. Final availability may be created for each day within the date range on the plurality of length of stays by combining the availability from the pre-compute database and the query attributes. A final availability of hotel rooms may be formatted for the at least one hotel for each day within the date range on the plurality of length of stays.

20 Claims, 8 Drawing Sheets

(56) References Cited

U.S. PATENT DOCUMENTS

| | | | |
|---|---|---|---|
| 7,313,548 B2 | 12/2007 | Sauser et al. | 705/400 |
| 7,328,166 B1* | 2/2008 | Geoghegan et al. | 705/5 |
| 7,340,403 B1 | 3/2008 | DeMarcken | 705/5 |
| 7,395,220 B2 | 7/2008 | Abrams et al. | 705/6 |
| 7,415,419 B2* | 8/2008 | Widjaja et al. | 705/5 |
| 7,979,457 B1* | 7/2011 | Garman | 707/768 |
| 2003/0187851 A1* | 10/2003 | Fay et al. | 707/10 |
| 2005/0033621 A1* | 2/2005 | Hartmann et al. | 705/8 |
| 2005/0283389 A1 | 12/2005 | Widjaja et al. | |
| 2008/0091480 A1* | 4/2008 | Geoghegan et al. | 705/5 |
| 2008/0319946 A1 | 12/2008 | Heyraud et al. | 707/3 |
| 2009/0150343 A1* | 6/2009 | English et al. | 707/3 |
| 2010/0042670 A1* | 2/2010 | Kamalakantha et al. | 709/203 |
| 2011/0099038 A1 | 4/2011 | Nishida | |

FOREIGN PATENT DOCUMENTS

| | | |
|---|---|---|
| WO | WO 2008/131068 | 10/2008 |
| WO | 2010/001914 A1 | 7/2010 |

OTHER PUBLICATIONS

International Search Report and Written Opinion mailed Dec. 10, 2012 in Application No. PCT/US11/26966 filed Mar. 3, 2011.
Philippines Patent Application No. 1/2012/501767, Substantive Examination Report, mailed May 2, 2014.
Mexican Patent Application No. MX/a/2012/010272, Notice of Allowance with Google translation, mailed Jun. 27, 2014.
European Patent Application No. 11709534, Supplemental European Search Report, mailed Jul. 7, 2014.
Korean Patent Application No. 10-2012-7026031, Notice of Preliminary Rejection, mailed Jul. 21, 2014.
Australian Patent Application No. 2011223654, Patent Examination Report No. 2, mailed Jul. 23, 2014.
Japanese Patent Application No. 2012-556233, Notice of Reasons for Rejection, mailed Sep. 2, 2014.
Russian Patent Application No. 2012142304/08(068131), Office Action, mailed Jan. 13, 2014 with English translation.
Mexican Patent Application No. MX/a/2012/010272, Office Action, mailed Jan. 23, 2014 with Google English translation.
Written Opinion issued in Singapore Patent Application No. 201206575-1, mailed Sep. 16, 2013.
Office Action issued in Mexican Patent Application No. MX/a/2012/010272, mailed Oct. 24, 2013.
Japanese Patent Application No. 2012-556233, Official Action mailed Dec. 20, 2013 with English translation.
Russian Patent Application No. 2012142304/08(068131), Notification regarding results of examination on patentability, mailed Aug. 4, 2014, with English Translation.
Canadian Patent Application No. 2 792 154, Official Action, mailed Oct. 20, 2014.
KR10-2012-7026031, Office Action, mailed Jan. 8, 2015, 6 pages.
SG2015/514428527Q, Examination Report, mailed Jan. 21, 2015, 7 pages.
PH1-2012-501767, Examination Report, mailed Feb. 5, 2015, 2 pages.

* cited by examiner

BOTTOM-UP OPTIMIZED SEARCH SYSTEM AND METHOD

BACKGROUND

Existing hotel and travel computerized reservation systems use a top down search approach, creating single availability cells as they are discovered from the search request. For example, such systems may allow a user to input search criteria, such as the identity of the hotel, the check-in date, and the check-out date, to discover available hotel rooms for the selected number of nights (i.e. Single Length of Stay). Only after the product items (i.e., hotel rooms) are found is business logic applied to find rates and availability for the specific set of product items.

This prior art approach has several disadvantages. Because of the top-down nature of this approach, the product items (e.g., sellable rooms) need to be searched for and discovered with each request. Further, the search request must have as a minimum a hotel name/code, a check-in date and a check-out date. The availability request will be rejected if these minimum elements are not in the request.

Moreover, the core service of the prior art approach only allows for one hotel to be checked at a time, and given that the check-in and check-out dates are used in the search, the rates and availability response reflects only the specific number of nights. The basic search allows no alternate dates to be used, and thus no alternate rates to be discovered.

If a city search is performed (i.e., a search focusing on one city), this request is broken up into multiple searches for single hotels, and each such core hotel search is performed one at a time. The core search service doesn't recognize relationships between multiple hotels. Because every core request is performed one hotel at a time, with each request requiring complex business rules to be performed to find rates and availability, the cost of CPU time and resources is high. Additionally, given the CPU- and resource-intensive nature of each request, the response time can be relatively slow. The need to discover and compute rates and availability rules for every request takes time.

Also, in the prior art system, the request is very user-specific and does not allow for the transaction system to help discover alternate types of products, such as different room types, etc.

Perhaps the biggest disadvantage of the existing art is the single availability cell. The single availability cell is derived from a well defined Length of Stay (LOS) in the search request. The LOS is derived from the Start Date and End Date in the search request. There is no visibility for the multiple possible combinations that can be derived from the LOS in the search request. For example, if the requestor want to also evaluate different options with respect of the LOS, it will require several separate search request for each LOS option. The prior art does not provide flexibility of alternate dates or product items. The cost and the time required to build a reply with full flexibility is not cost effective at this time. For example: if a customer wants to check availability for the first week of May, 49 separate availability calls will be required. Seven availability calls for each day of the week (i.e. 7 days×7 LOS values per day). This transaction will increase the cost by a factor of 48 times (i.e. difference between 1 call and 49 calls), and will result a very long response time to the customer (i.e., a bad user experience).

There therefore exists a need in the art for improvements to travel and hotel transaction systems, as described in further detail below.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, an embodiment may include, for example only, from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the figures and their previous and following description.

Figure 1A:
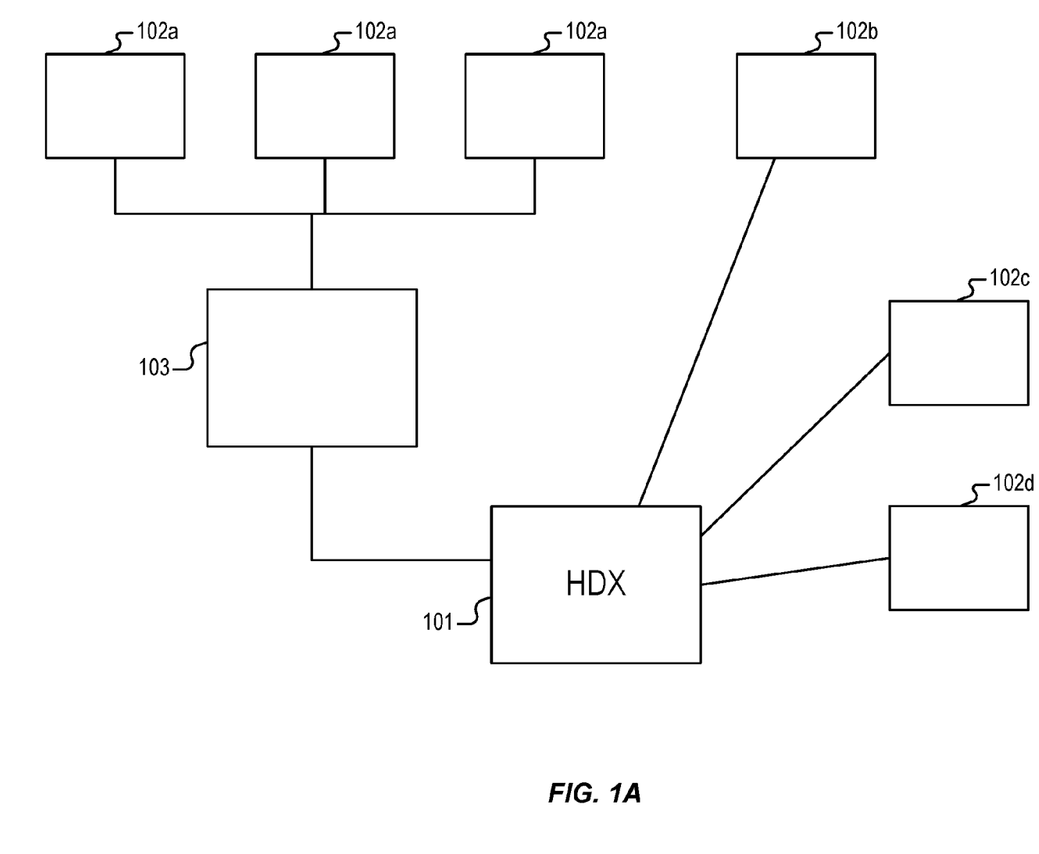
FIG. 1A depicts the architecture of a hotel reservation system.

The present invention provides for an improved hotel room availability transaction system. FIG. 1A depicts the architecture of a state-of-the art hotel reservation system; namely the HOLIDEX (HDX) system operated by Six Continents Hotels, Inc. for its worldwide chains of hotels. The present invention may be used in conjunction with this system, or any other suitable hotel reservation system available on the market.

In the reservation system of FIG. 1A, the HDX server 101 stores the current availability by date, rates, as well as other detailed information regarding hotel rooms. Various clients 102a, 102b, 102c and 102d may submit requests to the HDX server 101. For example, clients 102a may comprise travel web sites coupled to the HDX server 101 through an intermediary data center 103, using for example an OTA or XML protocol to communicate with the HDX server 101. Clients 102b may comprise global distribution systems (GDS) such as Sabre, Galileo, WorldSpan, Amadeus or TravelWeb, using, for example, the Pegasus protocol to communicate with the HDX server 101. The corporate owners of the hotel brands may communicate via clients 102c with the HDX server via, for example, the 3270 or XML protocols. Finally, individual hotels 102d may communicate with the HDX server 101 using, for example, the XML and/or the HMI protocol.

The availability search requests submitted by a client (102a, 102b, 102c and/or 102d) to the HDX server 101 may include as a minimum a hotel code, check-in date and check-out date. Because searching for multiple hotels, multiple data ranges, etc., can normally lead to the need for multiple searches on the HDX server 101, the present invention provides an improved way to perform searches, as described further below. The biggest challenge in today's environments (i.e. hardware and network) in every major data center is the tremendous growth of 60% availability traffic every year. The most efficient search process is a delicate balance between pre-compute data and on-the-go data. When millions of search requests hit a reservation system every day, the savings of having part of the availability data already computed translates into a powerful availability transaction system. To determine how to most efficiently perform searches on the HDX server 101, the availability process is tokenized to categorize each step based on various criteria. While the categorization may take many forms, in one embodiment the following criteria of Table A may be used:

TABLE A

| Criteria | Tokenization |
| --- | --- |
| Discovery process | Every element of the availability is graded (low to high) based on the amount of database calls and logic required to discover the product item for the request. For example, in one embodiment, the grading may be:<br>Hotel = low<br>Rate category = low<br>Product item = high |

TABLE A-continued

| Criteria | Tokenization |
| --- | --- |
| Processing cycles | Each business logic component may be graded (low to high) based on the amount of processing time it needs. For example, in one embodiment, the grading may be:<br>Close to arrival = low<br>Stay over days = medium<br>Net revenue = high |
| Association level | Each business logic component may be associated with the element of availability that executes specific business logic. For example, in one embodiment:<br>Net revenue = product item<br>Stay over days = rate category |

Figure 1B:
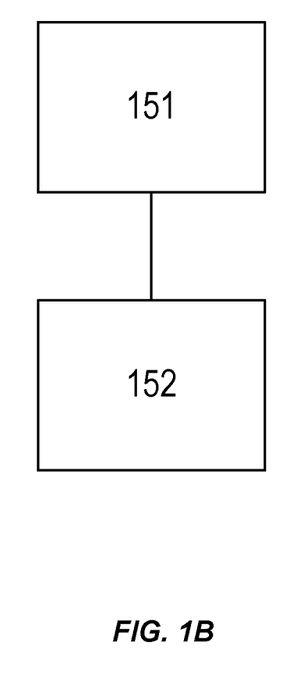
FIG. 1B depicts the architecture of the basic building blocks of the present invention, in one embodiment.

As depicted in FIG. 1B, the present invention includes a PreCompute Availability Database 151, as well as an Availability Rule Calculator Engine 152 In one embodiment, the PreCompute Availability Database 151 may comprise a relational database that has 2 main characteristics:

Each row represents the lowest possible sellable unit (product item) for one day. The discovery process to find the set of product items per day is not required. Every product item per day may be derived from a high level rate category that uses a rate code definition with room types associated by class and date range availability.

The size of the table should be manageable. The table is fast to update and to read from. The number of elements for each product item are very selective in order to maintain to a minimum the number of elements to pre-compute in each row.

The database primary key may be formed by: Hotel code, date, room type and rate category. The other key data of each row may be, in one embodiment:

Physical length of stay (LOS). This string value represents a bit mask for each night up to a stay of, for example, 14 days (any other maximum LOS could be chosen as well). The physical availability of the room type may use concepts of allocation, total number of rooms and run of the house room type. These rules may apply repeatedly for every night of the LOS mask.

Rate Amount. The rate amount may be derived from the rate code associated with the rate category of the product item. The amount value may be a flat amount or a percent value. At the same time, the amount may be found at the rate code level or from another base rate code.

Revenue LOS. This string value may represent a bit mask for each night up to, for example, a stay of 14 days (or any other maximum LOS). The yield management component may use a net revenue calculation based on the LOS. Positive revenue may be represented with an open (1) and a negative revenue may be represented with a closed (0). There may be several yield options that may indicate to use another value, based on other rate or overrides. These rules may apply repeatedly for every night of the LOS mask.

Rate Code. The parity concept may use the rate code to maintain levels of relationship between all rate codes.

The layout of this relational database produces a very fast way to fetch product items. It is possible to join the Pre-compute Availability Database 151 with attribute tables in order to implement filters at this initial stage. Some of the attributes like bed type, number of beds and/or maximum occupancy could, in one embodiment, help in the pre-selection of the product items. This is unlike the current art which applies filters at the end of the availability process, which leads to extra processing cycles on non-qualifying product items.

The values that are LOS-driven may use a bit mask representation. Each bit represents a night and the values could be open (1) or closed (0). There is no limitation in how long the LOS may represent. The proper value may correspond to the proper audience or hotel brand. For example, in one embodiment, extended stay brands may have up to 28 days or longer of LOS pre-calculated.

Figure 2:
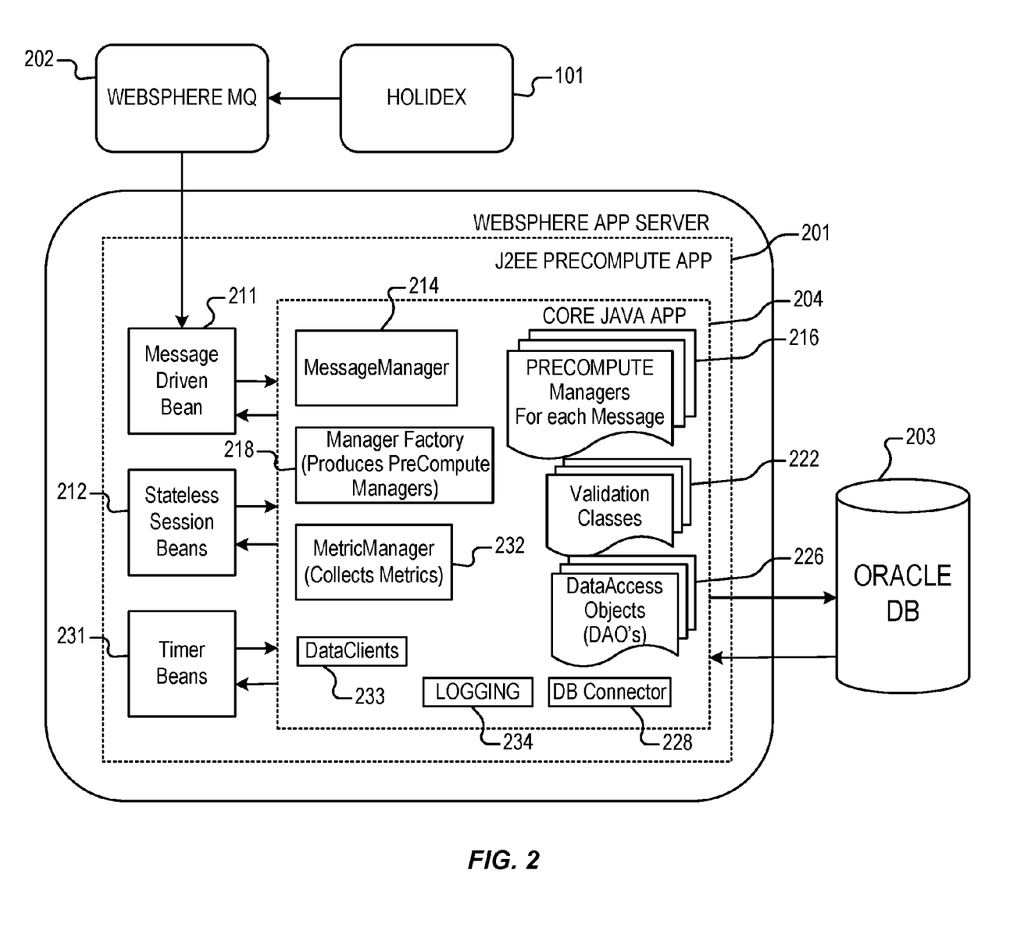
FIG. 2 depicts the architecture of the present invention in yet another embodiment.

As shown in FIG. 2, in one embodiment, the Availability Rule Calculator Engine 151 and PreCompute Availability Database 152 may comprise a PreCompute framework comprising a J2EE application 201 which consumes messages from a Web Sphere MQ 202 and processes the messages and updates an Oracle database 203 with required data. The framework may comprise a J2EE application 201 which may include a Core Java Application 204. FIG. 2 depicts the overall framework with the major components in each of the applications, according to one embodiment of the present invention. Other suitable frameworks may be used as well.

Figure 3:
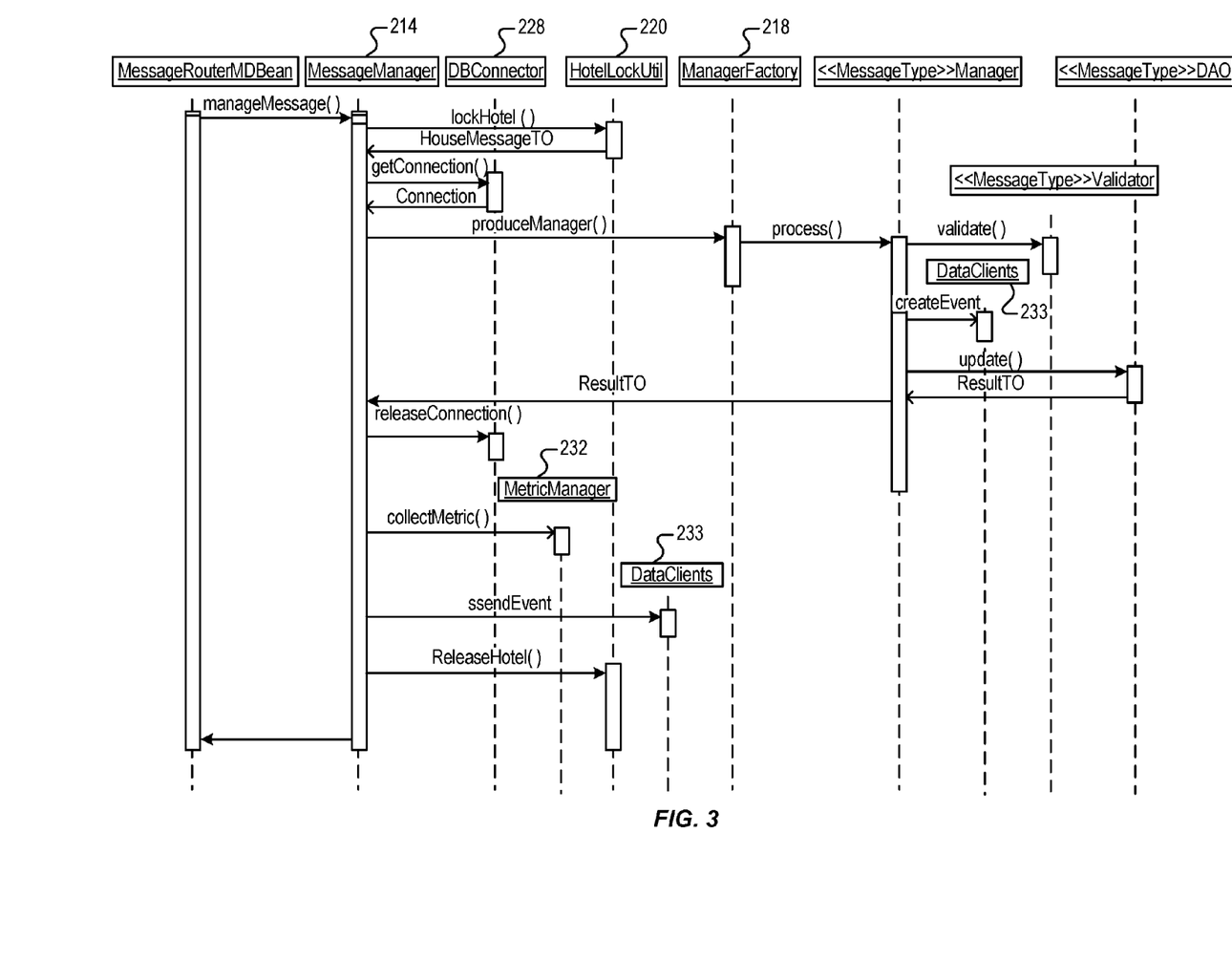
FIG. 3 depicts a high level sequence diagram depicting the invention, in one embodiment.
Figure 4:
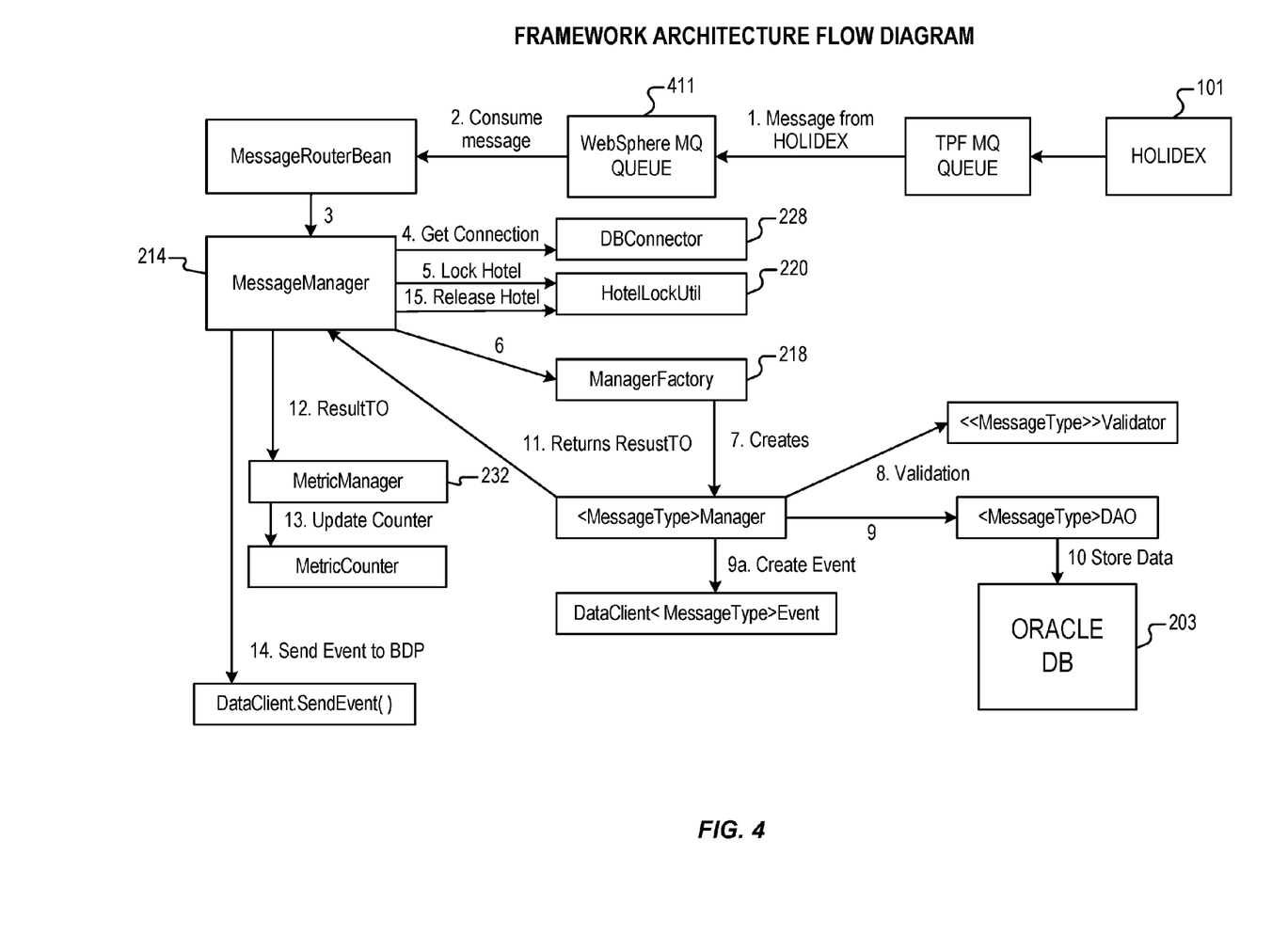
FIG. 4 is a framework architecture flow diagram, for use with the invention in one embodiment.

FIG. 3 is a high level sequence diagram that depicts the general flow of message processing in the Precompute Engine of FIGS. 1B and 2. This sequence diagram shows the scenario when messages arrive in sequence and are processed immediately. FIG. 4 is a framework architecture flow diagram, that depicts the overall flow of the present invention, in one embodiment.

The architectural components of FIGS. 2-4 will be defined in further detail below.

PreComputeMDBean 211—PreComputeMDBean 211 is a Message Driven Bean which listens on the MQ Series 202 Queue 411 which receives a message from HOLIDEX 101. It calls the MessageManager 214 with the XML message it received from HOLIDEX 101.

Stateless Session Beans 212: The following Stateless Session Beans 212 may be used:

BootStrapBean: used for initializing the Application. Log 4j and other Timer Task oriented beans are initialized here when the application starts up MessageManagerBean: This EJB is used to process the messages for all sources and clients. Basically it can call the MessageManager 214 or extend it. Also this bean can be called by the MDB 211.

Timer Beans 231—This EJB uses the Timer Service. This EJB is used to process messages which are pending in the pending message table. This EJB runs at predetermined time and calls the MessageManager, locks any hotel which has messages pending and process the message. It is important to process events from Holidex sequentially. The implementation of a cluster environment (i.e. different nodes can get updates for the same hotel at the same time) requires this method of update processing.

Metric Manager 232—This stateless session bean is used to collect metrics at pre defined time using Timer Service (say at every hour). It implements TimedObject. This EJB will be initialized by the BootStrapBean and the timer will be created.

Data Clients 233—The DataClients component is a single component that lives inside the PreCompute engine. It's role is two-fold. First it provides specific information regarding how Product Items are to be built on behalf of the Push clients. And second, it provides a means to notify those Push clients of the changes once they are made.

Logging 234—Log 4J will be used as a logging Mechanism for the Application. The logged Messages will be directed to a file on the server on which the application server is running. The Configuration for Log 4j Should be loaded by using a BootStrap EJB or using a start up class in the App server. There are different levels of logging: Debug, Info, Warn and Error.

MessageManager 214—Message Manager 214 primarily may perform two operations. First it converts the XML Message to a Java object and than it may call a particular PreCompute Manager 216 based on the message type. It also manages the sequential processing of messages based on Hotel code and message sequence number. It the messages are not in sequence, the message will be stored in a separate table for later processing.

ManagerFactory 218—Manager Factory 218 class dynamically creates the PreComputeManagers 216 based on the message type. Once it creates a manager, it may cache it for later use.

XMLSchema Java Classes—Theses XMLSchema Java classes may be a part of Message Manager 214, and are generated based on the XML Messages received from HOLIDEX 101. These classes hold the value of XML elements and attributes in their method. These XML bean classes are used as data carriers thus avoiding a separate transfer object for each message.

PreComputeManager 216—In one embodiment, there will a separate PreCompute Manager 216 for each message type or for a combination of message types. Their basic functionality is to convert the received Java objects to the desired database related fields using some business logic and PreCompute Utility classes. Most of the business processing happens here and in the Utility Classes HotelLockUtil 220—This class is used to lock a hotel data in House message table. The messages are processed for the hotel once the record is locked. It is necessary to lock the hotel in order to process messages in sequential order and prevent a race condition with other messages for same hotel. If messages are recorded out of sequence, it will invalidate the full database.

PendingMessageUtil—This Class is used for storing, retrieving and deleting messages in the pending message table. As the messages are read from the MQ queue using a cluster environment, it is necessary to process the messages in sequence. Every hotel message carries a sequence number to maintain sequence order processing.

Validation classes 222—In one embodiment, there are separate validation classes for each message. These validation classes validate the messages and if they found in error, they throw a PreComputeException Data Access Objects (DAOs) 226—The Data Access Objects 226 abstract the Communication and CRUD operations related to the Oracle Database 203. The PreCompute Manager 216 calls an appropriate DAO 226 to update the tables. The DAO 226 may be based on a single table or based on related tables. Basically this DAO 226 gets a database connection from a DBConnector class 228, prepares SQL calls to the database and performs the CRUD operations. Once these operations are done, it releases the connection to the database 203.

DBConnector 228—DBConnector 228 is a Java class which abstracts the connection mechanism for the database 203. In one embodiment, it will get the connection to the database 203 by calling a datasource object. This class will have various methods such as releasing the connection, rolling back a transaction, etc.

PreCompute Utility Components—All common functionality needed for the application may be developed as utility classes such as date validation or conversion of specific data as needed by the application. There may be some utility classes specific to message types.

The Availability Rule Calculator Engine 152 may include logic grouped into two categories:

Business logic that is based on the check-in date value of the search request, so it can not be pre-computed. An example of such logic would be advance purchase restrictions.

Business logic that was graded low in processing time (based on the criteria described previously with respect to Table A) and it was associated with a well-defined element of availability.

The overall goal is to develop a good balance between the PreCompute Availability Database 151 and the Availability Rule Calculator Engine 152 logic. This balance may be dynamically adjusted to maintain high performance. In case new logic is added to the availability model, this could modify the scoring in some of the elements of availability, which would create a new balance (i.e., a sweet spot) between the PreCompute Availability Database 151 and the Availability Rule Calculator Engine 152 logic.

The Availability Rule Calculator 152 handles the "on-the-go" logic of the availability process. Business rules may be separated in different components (i.e. availability calculators) so they can be implemented independently. There may be some fences and restrictions that can be applied in real time with each request. For example, these may represent attributes that hotels can set to control availability; for example: Advance Purchase, Stay-Over_nights, Minimum/Maximum Stay, Special requirements. Other fences and restrictions may only be found at the hotel level, rate category level and rate code level. The order in how the business rules are applied may have a direct impact in the processing time cycle.

The Availability Rule Calculator engine 152 may have two main components:

The Product item collector. the orchestrator of the Availability process. It uses a CollectionOptions to specify the rules and the order of the rules the will be applied.

The Availability Rule Calculators. Each Calculator (described further below with respect to FIG. 5) implements the MaskCalculator 507 interface and must provide a getMask( ) method that the Collector will call. The mask returned is ANDed, along with the other masks, against the current ProductItems LOS mask to apply the rule. They must also supply a reason code by implementing getReasonCode( ).

In one embodiment, the Availability Rule Calculator engine 152 may be built and operate as described in further detail below.

Class Model

Figure 5:
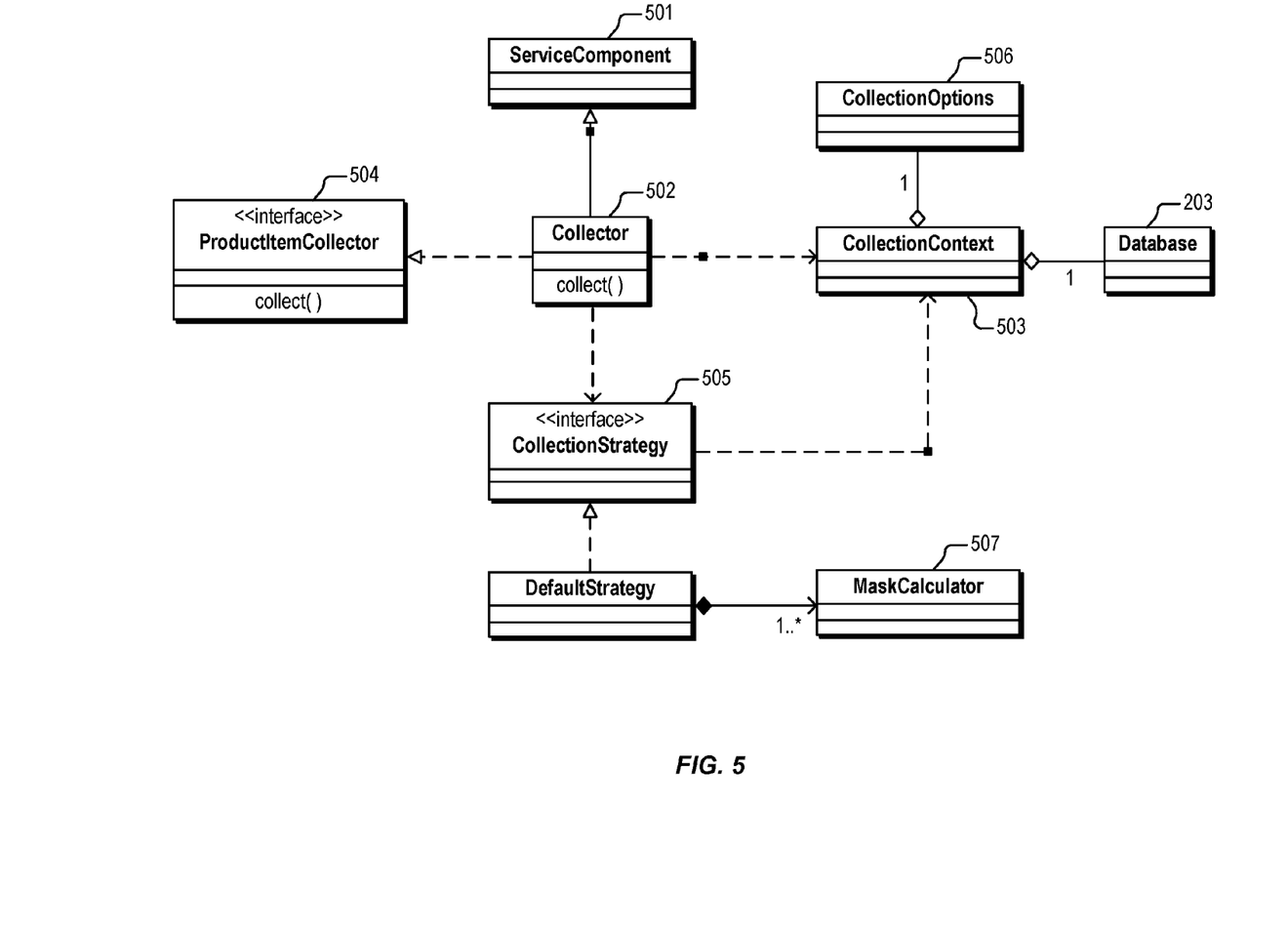
FIG. 5 is a diagram depicting the various calculators that could be used with the present invention, in one embodiment.

Internally, the Collector 502 collaborates with several "Calculator" components (507 and 601-606 of FIG. 6, described further below), each dedicated to a particular class of Length of Stay (LOS) rule. In general, each calculator returns a bit mask that is ANDed together with the ProductItem LOS masks to derive the overall LOS mask.

Collection Context

The CollectionContext object 503 is used for holding global state with respect to a collection cycle. When a caller invokes collect( ) on the Collector 502 (via the ProductItemCollector interface 504), the Collector 502 will create a CollectionContext object 503. The CollectionContext 503 may have the following properties:

Hotel Code
Rate Category Codes
Dates
Database Object
CollectionOptions
Cached Facts The CollectionContext 503 is passed into the constructor for each calculator The constructor initializes the environment of each calculator, and it is a software component of the class. The Calculators use the CollectionContext 503 to get the Database 203 to query the CRS tables. They also use it to share facts with each other through the context object. For example, if the Hotel is discovered to be a HIRO Hotel, then that fact may be important for more than one Calculator.

Calculators

Figure 6:
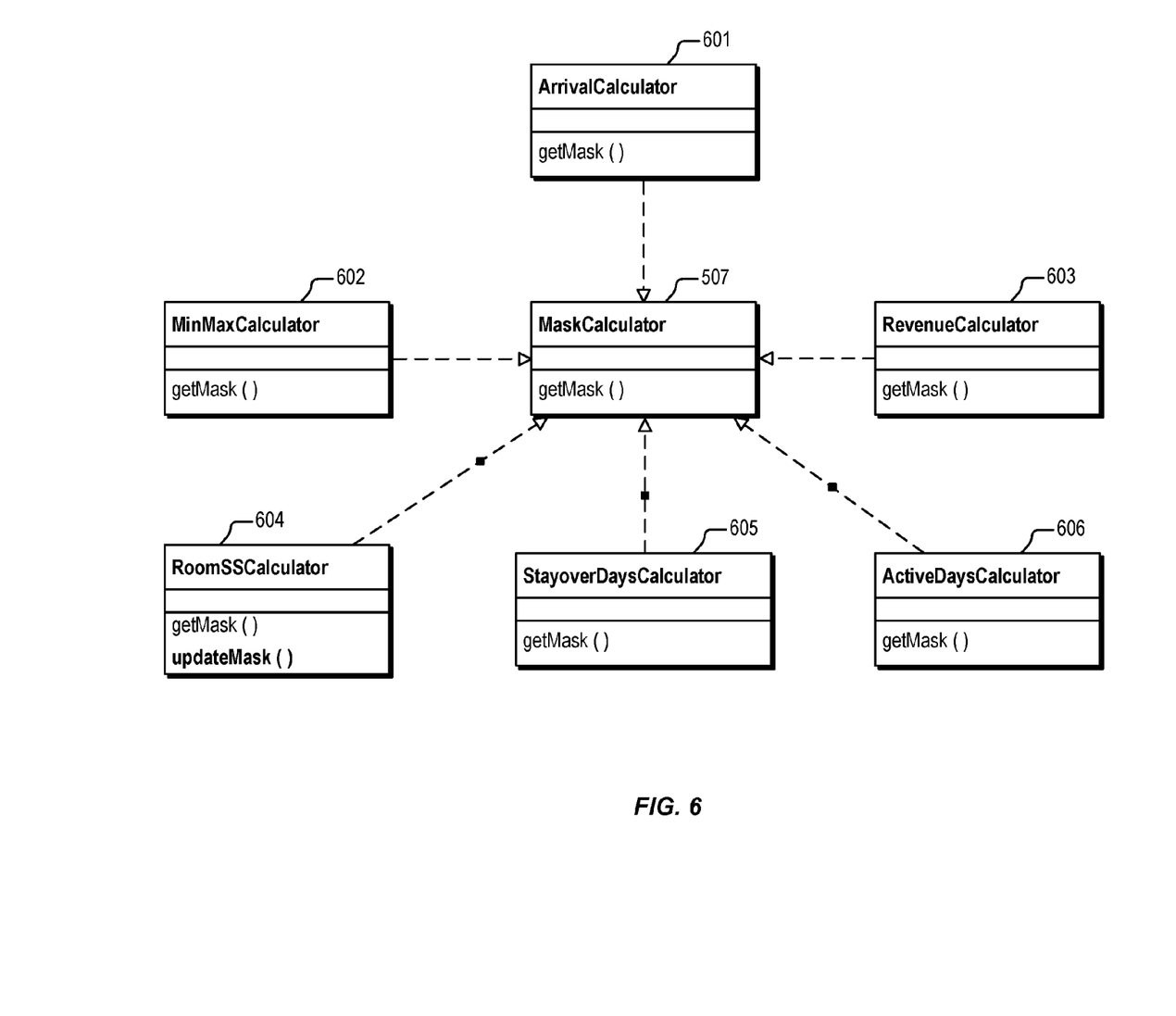
FIG. 6 is a sample UML that may be used for the mask calculators.

The Calculators (601-606) are key business logic components for the PACE engine. The CollectionStrategy 505 determines which Calculators to use based on what was specified in the CollectionOptions 506. Each Calculator implements the MaskCalculator 507 interface and can provide a getMask( ) method that the Collector 502 will call. The mask returned is ANDed, along with the other masks, against the current ProductItems LOS mask to apply the rule. A reason code may also be supplied by implementing, for example, getReasonCode( ).

A sample interface for the MaskCalculator 507 may be:

```
public interface MaskCalculator {
    int getMask(ProductItem pi) throws ServiceException;
    int getReasonCode( );
}
```

There may be any number MaskCalculators 507. FIG. 6 depicts an example UML for the current set. In one embodiment, the Calculators may carry a very specific fence or restriction rules of the IHG availability model, such as:

Arrival Calculator 601—It uses the check-in day of the request to validate if a black-out date or a closed to arrival is set at the hotel or rate category level.

MinMax Calculator 602—It uses the check-in date and the check-out date to derive a LOS. The LOS value should satisfy the minimum and maximum day of stay restriction, if it exists.

Revenue Calculator 603—It verifies that the LOS for specific rate amount produces a positive revenue.

RoomSS Calculator 604—It verifies that the specific room type is associated with the room sell strategy of the hotel. The hotel room sell strategy identifies the room types that are visible for sale.

StayoverDays Calculator 605—It uses the check-in date and the check-out date to derive a LOS. The LOS value should satisfy days of the week that required a stay over.

Active Days Calculator 606—It uses the check-in date and the check-out date to derive a LOS. The LOS value should satisfy days of the week that are flagged active.

Hotel Rule Cache

It is advantageous to have the PACE engine be as efficient as possible. With reference to FIGS. 5 and 6, much of this may fall on the implementation of the MaskCalculators 507 since they include hotel rules encoded in the CRS database. Each time the PACE engine constructs a new MaskCalculator 507, the calculator 507 can optimize itself by prefetching data it needs only once from the database 203, and then using it repeatedly for each invocation of its getMask( ) method. Even so, having all of the calculators query the database for rules that rarely change is a significant hit on performance, and should be avoided.

To address this, the CollectionContext object 503 (FIG. 5) may include support to cache rules on behalf of the MaskCalculators 507. Once a MaskCalculator 507 has built its rules from the database 203, it can cache them on the CollectionContext 503. This in turn means all MaskCalculators 507 can first check to see if the rules they need are still present before hitting the database 203 and rebuilding the rules. This model will contribute to an increase in performance, and therefore can be used whenever possible.

Here is what the methods may look like for caching rules:

```
public class CollectionContext {
    public Object getHotelRules(MaskCalculator c);
    public void putHotelRules(MaskCalculator c, Object rules);
}
```

Once a MaskCalculator 507 caches rules, the rules may remain in memory until one of the following events occur:

Hotel rules change in the database 203

LRU cache purges the hotel rules for resource management

Application is restarted

In one embodiment, the MaskCalculators 507 may make every effort to use the cache methods and assume they are reliable. If a suitable solution for cache-change management is not available, then the PACE engine may ensure the cache isn't activated. Still, the MaskCalculators 507 may assume the cache active at all times.

Collection Strategies

Because the PACE engine can be utilized for different purposes, a single search algorithm for all cases isn't appropriate. For example, availability requests from the Pull application may look at the higher level restrictions first and the product items last whereas the Push application [may want to look at the product items first and apply the rules in the most efficient order possible.

To address this, the PACE engine may use a CollectionStrategy 505 interface to represent how the collection is actually performed. This is basically an implementation of the Abstract Algorithm design pattern known to those having ordinary skill in the art. The selection of the strategy may be based on the settings in the CollectionOptions 506.

A sample interface for CollectionStrategy 505 is provided below:

```
public interface CollectionStrategy {
    void collect(CollectionContext ctx,
            ProductItemConsumer consumer) throws ServiceException;
}
```

In one embodiment, supported CollectionStrategies 505 may include:

| Class | Description |
| --- | --- |
| BaseStrategy | abstract class with basic calculation template method |
| DefaultStrategy | extends BaseStrategy with SQL criteria for rate-category codes |
| ProductItemIDStrategy | extends BaseStrategy with SQL criteria for product item ids |

Queries

When the PACE engine is invoked, it may ultimately read the product items from the product item table and apply the MaskCalculators 507 to derive the final LOS. The query used to select the product items may take into consideration a number of factors. These include:

Selection Criteria

LOS History

Sell-Thru Exclusions

The sections below describe these aspects for the query in more detail.

Basic Query

LOS History

Sell-Thru Exclusions (1) Basic Query

The basic query represents the simplest form of the SQL that selects the product items. In reality, this may not be the actual SQL used. But it is described since it may serve as the base-line for the other fully formed queries. In other words, to understand the full queries, an understanding of the basic query is important.

The criteria for the base query includes the following:

Hotel Code

Date Range

Rate Category Codes

Valid Status

Change Token (optional)

Excluded Room Codes (optional)

Product Item IDs (optional)

"Valid Status" just means to skip the invalid Product Item rows. Change Token is used to select rows with a Token value equal to or higher than a specified value. The Excluded Rooms Types are used to filter out excluded rooms. Lastly, a list of Product Item IDs can be included instead of the Change Token for a more precise selection of product items.

The Token value and the Product Item IDs are used to help filter down only those Product Items that have actually been modified by PreCompute. While there are various ways that can be used to best indicate when and why Product Items change for PreCompute, the token number plus the product item IDs may be used in one embodiment.

The order that the Product Items are delivered to the ProductItemConsumer is important for two reasons. First, it allows the Calculators 507 to be efficient about context switching. Second, it allows the ProductItemConsumers to easily organize the results they are building.

To this end, the results may be ordered as follows:

Date

Rate Category Code

Room Code

Figure 7:
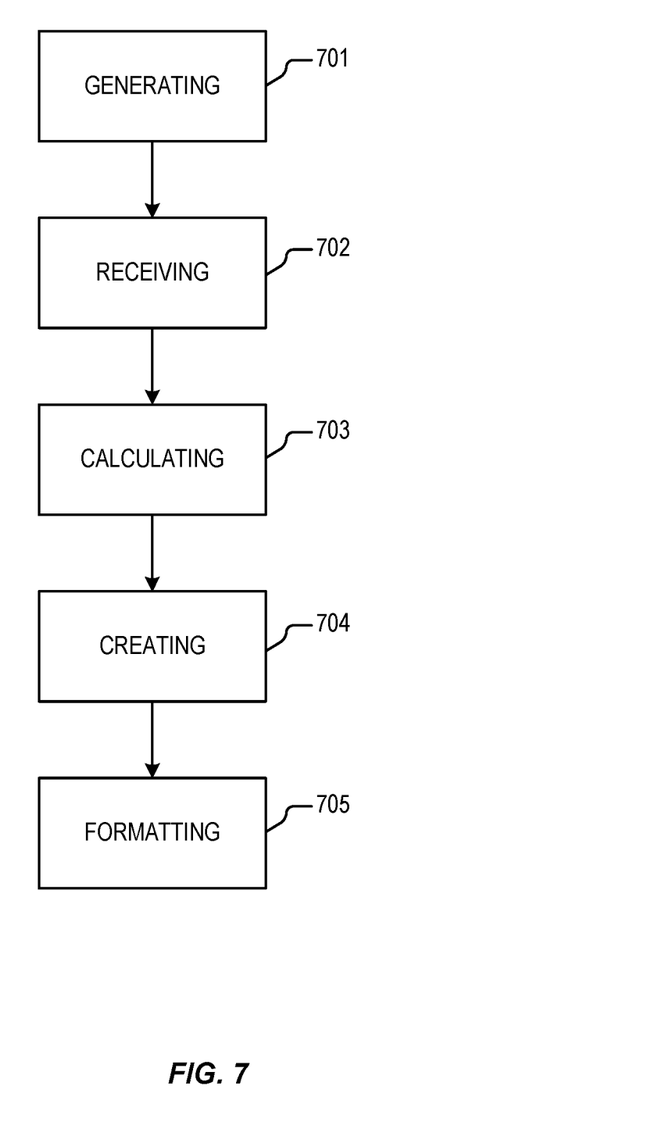
FIG. 7 depicts steps that may be taken by the present invention, in one embodiment.

Based upon the above teachings, and with reference to FIG. 7, in one embodiment the present invention may therefore perform the steps of:

generating a pre-compute database comprising real-time availability attributes associated with hotel rooms on a plurality of length of stays (step 701);

receiving a query for at least one hotel for a date range, the date range having a start date and an end date (step 702);

calculating the availability of each day within the date range on a plurality of length of stays by applying business requirements according to the query (step 703);

creating final availability for each day within the date range on the plurality of length of stays by combining the availability from the pre-compute database and the query attributes (step 704); and formatting a final availability of hotel rooms for the at least one hotel for each day within the date range on the plurality of length of stays (step 705).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method for improving searches of data sources by balancing between pre-compute data and on-the-go data, comprising the steps of:

categorizing, by a computer system, a plurality of steps of an availability query process into a plurality of categories, wherein the availability query process processes a query to search the data sources and output a final result indicating availabilities of hotel rooms;

associating, by the computer system, a plurality of scores to the plurality of categories, wherein each score is based on an amount of database calls, discovery logic, and processing time;

performing, by the computer system prior to receiving the query, a step of the plurality of steps based on the corresponding score of the step to generate data for a pre-compute database;

updating, by the computer system, the pre-compute database based on performing the step, the data of the pre-compute database comprising real-time availability attributes associated with hotel rooms on a plurality of length of stays;

receiving, by the computer system, the query to the pre-compute database, the query comprising a request for at least one hotel for a date range, the date range having a start date and an end date;

determining, by the computer system, a first search result from the pre-compute database based on the query, the first search result comprising a first availability associated with at least one of the plurality of length of stays;

adding, by the computer system, logic to the availability query process;

updating, by the computer system based on the added logic, the scores associated with the plurality of categories;

determining, by the computer system based on the updated scores, that one or more other steps of the plurality of steps of the availability query process are to be performed on another data source different than the pre-compute database;

performing, by the computer system, the determined one or more other steps, the one or more other steps comprising:

calculating, based on the query and on applying requirements, a second search result from the other data source, the second search result comprising availability of each day within the date range on a plurality of length of stays, wherein the requirements comprise one or more hotel-based requirements and one or more processing time-based requirements associated with processing time cycles, wherein the order in which the one or more hotel-based requirements is applied impacts the processing time cycles;

creating, by the computer system, the final result by combining the first search result and the second search result, the final result comprising a final availability for each day within the date range on the plurality of length of stays; and formatting, by the computer system, the final result, the formatting comprising formatting the final availability of hotel rooms for the at least one hotel for each day within the date range on the plurality of length of stays.

2. The computer-implemented method of claim 1, wherein creating the final result includes using a bit mask to represent a length of stay, with each bit representing a day in the length of stay.

3. The computer-implemented method of claim 1, wherein the query is received from a travel web site.

4. The computer-implemented method of claim 1, wherein the query is received from a client.

5. The computer-implemented method of claim 1, wherein the calculating step is performed with a fence rule.

6. The computer-implemented method of claim 1, wherein the calculating step is performed with a restriction rule.

7. The computer-implemented method of claim 1, further comprising the step of transmitting the final availability of hotel rooms to a travel web site.

8. The computer-implemented method of claim 1, further comprising the step of transmitting the final availability of hotel rooms to a client.

9. The computer-implemented method of claim 1, wherein creating the final availability for each day within the date range includes combining pre-computed data associated with the first availability from the pre-compute database and dynamically-computed data associated with the availability from the second search result.

10. The computer-implemented method of claim 9, further comprising adjusting a ratio between the pre-computed data and the dynamically-computed data.

11. The computer-implemented method of claim 10, wherein adjusting the ratio between the pre-computed data and the dynamically-computed data is based at least in part on a processing time of at least one of the one or more processing time-based requirements.

12. A system for improving searches of data sources by balancing between pre-compute data and on-the-go data, comprising:
one or more processors;
memory, including executable instructions that, when executed by the one or more processors, cause the system to at least:
categorize a plurality of steps of an availability query process into a plurality of categories, wherein the availability query process processes a query to search the data sources and output a final result indicating availabilities of hotel rooms;
associate a plurality of scores to the plurality of categories, wherein each score is based on an amount of database calls, discovery logic, and processing time;
perform a step of the plurality of steps based on the corresponding score of the step to generate data for a pre-compute database;
update the pre-compute database based on performing the step, the data of the pre-compute database comprising real-time availability attributes associated with hotel rooms on a plurality of length of stays;
receive the query to the pre-compute database, the query comprising a request for at least one hotel for a date range, the date range having a start date and an end date;
determine a first search result from the pre-compute database based on the query, the first search result comprising a first availability associated with at least one of the plurality of length of stays;
add logic to the availability query process;
update the scores associated with the plurality of categories based on the added logic;
determine, based on the updated scores, that one or more other steps of the plurality of steps of the availability query process are to be performed on another data source different than the pre-compute database;
perform the determined one or more other steps, the one or more other steps comprising:
calculate, based on the query and on applying requirements, a second search result from the other data source, the second search result comprising availability of each day within the date range on a plurality of length of stays, wherein the requirements comprise one or more hotel-based requirements and one or more processing time-based requirements associated with processing time cycles, wherein the order in which the one or more hotel-based requirements is applied impacts the processing time cycles;
create the final result by combining the first search result and the second search result, the final result comprising a final availability for each day within the date range on the plurality of length of stays; and
format the final result, the formatting comprising formatting the final availability of hotel rooms for the at least one hotel for each day within the date range on the plurality of length of stays.

13. The system of claim 12, wherein updating the pre-compute database includes using a bit mask to represent a length of stay, with each bit representing a day in the length of stay.

14. The system of claim 12, wherein the query is from a travel web site.

15. The system of claim 12, wherein the query is from a client.

16. The system of claim 12, wherein calculating the second search result includes using a fence rule.

17. The system of claim 12, wherein calculating the second search result includes using a restriction rule.

18. The system of claim 12, wherein the instructions further cause the one or more processors to collectively transmit the final availability of hotel rooms to a travel web site.

19. The system of claim 12, wherein the instructions further cause the one or more processors to collectively transmit the final availability of hotel rooms to a client.

20. A computer program product, comprising a non-transitory computer-readable medium storing a computer-readable program code embodied therein, the computer-readable program code adapted to be executed to implement a method for improving searches of data sources by balancing between pre-compute data and on-the-go data, comprising:
categorizing a plurality of steps of an availability query process into a plurality of categories, wherein the availability query process processes a query to search the data sources and output a final result indicating availabilities of hotel rooms;
associating a plurality of scores to the plurality of categories, wherein each score is based on an amount of database calls, discovery logic, and processing time;
performing a step of the plurality of steps based on the corresponding score of the step to generate data for a pre-compute database;
updating the pre-compute database based on performing the step, the data of the pre-compute database comprising real-time availability attributes associated with hotel rooms on a plurality of length of stays;
receiving the query to the pre-compute database, the query comprising a request for at least one hotel for a date range, the date range having a start date and an end date;
determining a first search result from the pre-compute database based on the query, the first search result comprising a first availability associated with at least one of the plurality of length of stays;
adding logic to the availability query process;
updating the scores associated with the plurality of categories based on the added logic;
determining, based on the updated scores, that one or more other steps of the plurality of steps of the availability query process are to be performed on another data source different than the pre-compute database;
performing the determined one or more other steps, the one or more other steps comprising:
calculating, based on the query and on applying requirements, a second search result from the other data source, the second search result comprising availability of each day within the date range on a plurality of length of stays, wherein the requirements comprise one or more hotel-based requirements and one or more processing time-based requirements associated with processing time cycles, wherein the order in which the one or more hotel-based requirements is applied impacts the processing time cycles;
creating the final result by combining the first search result and the second search result, the final result comprising a final availability for each day within the date range on the plurality of length of stays; and formatting the final result, the formatting comprising formatting the final availability of hotel rooms for the at least one hotel for each day within the date range on the plurality of length of stays.

\* \* \* \* \*